United States Patent
El Bounia (10) Patent No.: US 7,943,065 B2
(45) Date of Patent: May 17, 2011

(54) CONDUCTIVE CARBON NANOTUBE-POLYMER COMPOSITE

(75) Inventor: Nour Eddine El Bounia, Orthez (FR)

(73) Assignee: Arkema France, Colombes (FR)

( * ) Notice: Subject to any disclaimer, the term of this patent is extended or adjusted under 35 U.S.C. 154(b) by 287 days.

(21) Appl. No.: 12/297,120

(22) PCT Filed: Apr. 10, 2007

(86) PCT No.: PCT/IB2007/001609
§ 371 (c)(1),
(2), (4) Date: Oct. 14, 2008

(87) PCT Pub. No.: WO2007/119172
PCT Pub. Date: Oct. 25, 2007

(65) Prior Publication Data
US 2009/0200517 A1   Aug. 13, 2009

Related U.S. Application Data (60) Provisional application No. 60/812,194, filed on Jun. 9, 2006.

(30) Foreign Application Priority Data

Apr. 14, 2006 (EP) .................... 06290612

(51) Int. Cl.
*H01B 1/06* (2006.01)
*C08G 18/42* (2006.01)
*C08G 63/60* (2006.01)
*A61K 9/16* (2006.01)

(52) U.S. Cl. ......... 252/511; 524/500; 524/543; 524/599

(58) Field of Classification Search ............... 252/500, 252/511; 524/500, 543, 599
See application file for complete search history.

(56) References Cited

U.S. PATENT DOCUMENTS

| | | | |
|---|---|---|---|
| 5,445,327 A | 8/1995 | Creehan | |
| 5,466,323 A | 11/1995 | Decker et al. | |
| 5,643,990 A | 7/1997 | Uehara et al. | |
| 5,744,235 A | 4/1998 | Creehan | |
| 6,752,977 B2 | 6/2004 | Smalley et al. | |
| 6,905,667 B1 | 6/2005 | Chen et al. | |
| 7,008,563 B2 | 3/2006 | Smalley et al. | |

(Continued)

FOREIGN PATENT DOCUMENTS

EP    1505118 A1 *  2/2005

(Continued)

OTHER PUBLICATIONS

Grunlan et al, "Water-Based Single-Walled-Nanotube-Filled Polymer Composite with an Exceptionally Low Percolation Threshold," Adv. Mater. 16(2), pp. 150-153 (2004).*

(Continued)

*Primary Examiner* — Mark Kopec
*Assistant Examiner* — Jaison P Thomas
(74) *Attorney, Agent, or Firm* — Steven D. Boyd (57) ABSTRACT

The present invention relates to a conductive carbon nanotube-polymer composite, comprising carbon nanotubes, and a mixture of polymers in a form of coalesced polymer particles, wherein the mixture of polymer particles in their non coalesced form is defined by the presence of at least two population of polymer particles having a size distribution which is at least bimodal.

26 Claims, 2 Drawing Sheets latex core/shell structure

U.S. PATENT DOCUMENTS

| | | | |
|---|---|---|---|
| 7,052,629 B2 * | 5/2006 | Maeda et al. | 252/511 |
| 7,090,819 B2 | 8/2006 | Smalley et al. | |
| 7,241,496 B2 | 7/2007 | Chen et al. | |
| 7,244,407 B2 | 7/2007 | Chen et al. | |
| 7,264,876 B2 | 9/2007 | Smalley et al. | |

FOREIGN PATENT DOCUMENTS

| | | | |
|---|---|---|---|
| EP | 1777258 A1 * | 4/2007 | |
| WO | WO 2004/097853 | 11/2004 | |

OTHER PUBLICATIONS

Journet, C. et al, Large-Scale Production of Single-Walled Carbon Nanotubes by the Electric-Arc Technique, Nature (London), 388 (1997) 756-758.

Rinzler, A.G., Large-Scale Purification of Single-Wall Carbon Nanotubes:Process, Product, and Characterization, Appl. Phys. A, 67 (1998) 29-37.

Nikolaev, P. et al., Gas-Phase Catalytic Growth of Siingle_Walled Carbon Nanotubes From Carbon Monoxide, Chem. Phys. Lett., 313 (1999) 91-97.

Yakobson, B. et al., Fullerene Nanotubes: C1,000,000 and Beyond, American Scientist, vol. 85 (Jul.-Aug. 1997) 324-337.

O'Connell, M. et al., Reversible Water-Solubilization of Single-Walled Carbon Nanotubes by Polymer Wrapping, Chem. Phys. Lett, 342 (2001) 265-271.

Schneider, M. et al., High Solids Content Emulsions. I. A Study of the Influence of the Particle Size Distribution and Polymer Concentration on Viscosity, Journal of Applied Polymer Science, vol. 84 (2002) 1878-1896.

Schneider, M. et al., High Solids Content Emulsions. II. Preparation of High Seed Latices, Journal of Applied Polymer Science, vol. 84, (2002) 1897-1915.

Boutti, S. et al., New Routes to High Solid Content Latexes: A Process for In Situ Particle Nucleation and Growth, Macromol. Symp., 286 (2004) 383-398.

Bandyopadhyaya et al., Stabilization of Individual Carbon Nanotubes in Aqueous Solutions, NanoLetters, vol. 2, No. 1, (2002) 25.

* cited by examiner

Figure 1 latex core/shell structure

Monomodal     bimodal     trimodal

CONDUCTIVE CARBON NANOTUBE-POLYMER COMPOSITE

FIELD OF THE INVENTION

This invention relates generally to composites comprising polymers and carbon nanotubes, and more particularly to conductive composites comprising polymers and multi wall carbon nanotubes.

BACKGROUND OF THE INVENTION

Since their discovery in 1991, carbon nanotube is a fascinating subject for curiosity-driven research. This carbon material is a graphene cylinders called carbon nanotube (CNT). There are two main CNT varieties: Multi-Walled NanoTubes (MWNT), are collections of several concentric graphene cylinders and are larger structures compared to Single-Walled NanoTubes (SWNTs) which are individual cylinders.

These structures, produced by three main methods process: arc discharge (C. Journet and al. in Nature (london), 388 (1997) 756), laser furnace (A. G. Rinzler and al. in Appl. Phys. A, 1998, 67, 29) and chemical vapor deposition (P. Nicolaev and al. in Chem. Phys. Lett., 1999, 313, 91) make them a very unique material with a whole range of promising applications.

They have the right combination of properties—nanometersize diameter, structural integrity, high electrical conductivity, high mechanical properties and chemical stability. There have been some successes in several domains demonstrating potential applications of nanotubes.

This is well reflected in the literature as well as in the huge number of patents filled worldwide: electronic and electrochemical applications of nanotubes, nanotubes as mechanical reinforcements in high performance composites, nanotube-based field emitters, and their use as nanoprobes in metrology and biological and chemical investigations, and as templates for the creation of other nanostructures, electronic properties and device.

For background information and some application patents see WO 91/03057 U.S. Pat. No. 5,744,235, U.S. Pat. No. 5,445,327, U.S. Pat. No. 54,663,230, B. I. Yakobson and R. E. Smalley, American Scientist, 85 (July-August, 1997) pp. 324-337.

Carbon nanotubes have substantial potential for enhancing the strength, elasticity, toughness, electrical conductivity and thermal conductivity of polymer composites, however incorporation of the nanotubes into composites has been complicated by the tendency to aggregate and impair dispersion of the nanotubes.

Generally, preparation of most polymer-multi-wall-carbon composites has been directed to achieve a uniform carbon nanotube dispersion in polymers using such methods as mechanical mixing, melt-blending, solvent blending, in-situ polymerization and combinations thereof.

Generally homogenous aqueous dispersions of single-wall carbon nanotubes have been prepared by using certain water-soluble polymers that interact with the nanotubes to give the nanotubes solubility in aqueous systems. (See M. J. O'Connell et al., Chem. Phys. Lett. 342 (2001) p. 265). Such systems are described in International Patent Publication, WO 02/16257, published Feb. 28, 2002.

Conductive polymer composites containing carbon-based fillers are desired for their unique combination of metallic conductivity and polymer flexibility. Such conductive polymer composites are useful as materials for electromagnetic interference (EMI) shielding, heat dissipation films, paints, coatings, adhesives, chemical sensors, actuators, photoconductors, and impedance adapters for organic light emitting diodes (OLEDs).

One carbon-based filler that has been used in polymer composites is carbon black. However, in order to achieve the desired electrical conductivity with carbon black, concentrations of more than 10 wt % are often needed in the polymer when processed by typical solution or melt-based techniques.

High filler loadings, such as these, can result in processing difficulties and loss of polymer properties, such as flexibility. Generally this result obliges to reformulate the polymer to recover mechanical properties.

The critical filler concentration needed to achieve true electrical conductivity is known as the percolation threshold. A need remains for a conductive polymer composite with a percolation threshold at a low critical filler concentration in order to retain polymer properties (mechanical, optical, surface aspect . . . ) and processability, as well as provide a composite with effective conductive properties.

The percolation threshold is the critical concentration of conductive fillers needed to pass the polymer (or formulation) from insulator to conductive state. The main parameters to achieve low percolation threshold are: good dispersion and high carbon nanotube aspect ratio.

WO 2004/097853 provides a conductive carbon nanotube-polymer composite which comprises carbon nanotubes and polymer, wherein the polymer is in a form of coalesced polymer particles, wherein the carbon nanotubes reside primarily between the polymer particles, and wherein the carbon nanotubes form an interconnecting network at the interface between at least some of the coalesced polymer particles. The network of carbon nanotubes in the carbon-nanotube polymer composite provides electrical and thermal conductivity to the composite.

There is still a need for improving the electrical and thermal conductivity of such carbon nanotube-polymer composite.

SUMMARY OF THE INVENTION

The invention is related to a method for making a conductive carbon nanotube composite comprising:

(a) forming a polymer particles suspension which comprises the mixing in a solvent, preferably water, of at least two populations of particles having a size distribution which is at least bimodal;

(b) forming a carbon nanotube suspension comprising carbon nanotubes and a solvent;

(c) adding the carbon nanotube suspension in the polymer particles suspension, to form a carbon nanotube-polymer mixture suspension, (d) optionally mixing the resulting suspension with optional heating and (e) removing the solvent from the carbon nanotube-polymer suspension to form a carbon nanotube-polymer composite.

The Applicant has now found that the electrical properties of this new composite are improved. Notably the composite of the invention provides a surprising synergistic effect of the electrical resistivity.

Thus, the final resistivity of the composite of the invention is lower than the resistivity of an equivalent composite which comprises a single polymer having a monomodal particle size distribution in the non coalesced form.

In a particular embodiment of the method, each particle of the conductive composite is made with a polymer mixture. Preferably the polymer is a core/shell polymer.

In another embodiment of the method, each particle of the conductive composite is made, each particle of the conductive composite is made with a different polymer.

In one embodiment, the polymer is selected from acrylate polymers, acrylic acid polymers, polyacrylic esters, polyacrylamides, polyacrylonitriles, chlorinated polymers, fluorinated polymers, styrenic polymers, polyurethanes, natural rubber, synthetic rubber polymers, vinylchloride-acrylate polymers, and copolymers thereof.

In a particular embodiment, the polymer is selected from the group consisting of polystyrene-b-polyisoprene-b-polystyrene (SIS), polystyrene-b-polybutadiene-b-polystyrene (SBS), polymethylmethacrylate-b-polybutylacrylate-b-polymethylmethacrylate, polystyrene-b-polybutadiene-b-polymethylmethacrylate (SBM), poly (vinyl acetate), poly (acrylic acid), poly (methyl methacrylate), polyacrylamide, polyacrylonitrile, polyvinylpropionate, polystyrene, polytetrafluoroethylene, poly (vinyl chloride), poly (vinylidene chloride), poly (vinyl chloride-ethylene), poly (vinyl chloride-propylene), poly (styrene-co-butadiene), styrene-acrylate copolymers, vinyl ethylene-vinyl chloride copolymer, poly (vinyl acetate-acrylate), poly (vinyl acetate-ethylene).

In one embodiment of the method, the polymer core is a cross linked elastomeric composition selected from the group comprising styrene butadiene, styrenebutylacrylate and the polymer shell is a long chain of (co)polymer selected from the group comprising polyacrylamide, polymethylmethacrylate and copolymer thereof.

In a particular embodiment of the method of the invention, the conductive composite the size distribution is bimodal.

In another embodiment of the method of the invention, the number average polymer particle size of the small particles (Dns) is in the range of 20 to 100 nm and the number average polymer particle size of the large particles (Dnl) is in the range of 200 to 500 nm.

In another embodiment of the method of the invention, the size distribution is trimodal and the number average polymer particle size of the small particles (Dns) is below 120 nm, the number average polymer particle size of the medium particles (Dnm) is from 120 to 200 nm and the number average polymer particle size of the large particles (Dnl) is more than 200 nm.

In another embodiment of the method of the invention, the packing volume fraction of the small particles is from 10 to 15%, the packing volume fraction of the medium particles is from 0 to 10% and the packing volume fraction of the large particles in their non coalescent form is from 75 to 85%.

In another embodiment of the method of the invention, particle size ratio defined by the number average polymer particle size of the large particles over the number average polymer particle size of the small particles, Dnl/Dns is from 15 to 3, preferably 5 to 10, more preferably 6 to 9.

In another embodiment of the method of the invention, the particle size ratio defined by the number average polymer particle size of the large particles over the number average polymer particle size of the medium particles, Dnl/Dnm is 3 to 1.2 preferably 1.8.

In another embodiment of the method of the invention, the difference between the maximum of two end peaks of the size distribution profile is in the range of 50 to 500 nm, preferably 150 to 300 nm.

In another embodiment of the method of the invention, the ratio of Dnl/Dns expressed in weight % is in the range of 95/5 to 5/95, preferably 90/10 to 50/50.

In another embodiment of the method of the invention, the polymer particles size are less than 1000 nm.

In another embodiment of the method of the invention, the nanotube-polymer composite has a percolation threshold of less than 0.5% carbon nanotubes in the composite.

In another embodiment of the method of the invention, the carbon nanotube-polymer composite comprises nanotubes in an amount less than about 10 wt % of the composite, preferably less than about 5 wt % of the composite, more preferably less than about 1 wt % of the composite, and particularly less than about 0.1 wt % of the composite.

The invention is also related to a conductive carbon nanotube-polymer composite, comprising:

(a) carbon nanotubes, and (b) a mixture of a core/shell polymer in a form of coalesced polymer particles, wherein the mixture of polymer particles in their non coalesced form is defined by the presence of at least two population of polymer particles having a size distribution which is at least bimodal.

In one embodiment of the conductive composite of the invention, the polymer core is a cross linked elastomeric composition selected from the group comprising styrene butadiene, styrenebutylacrylate and the polymer shell is a long chain of (co)polymer selected from the group comprising polyacrylamide, polymethylmethacrylate and copolymer thereof.

In a particular embodiment of the conductive composite of the invention, the size distribution is bimodal.

In another embodiment of the conductive composite of the invention, the number average polymer particle size of the small particles (Dns) is in the range of 20 to 100 nm and the number average polymer particle size of the large particles (Dnl) is in the range of 200 to 500 nm.

In another embodiment of the conductive composite of the invention, the size distribution is trimodal and the number average polymer particle size of the small particles (Dns) is below 120 mm, the number average polymer particle size of the medium particles (Dnm) is from 120 to 200 nm and the number average polymer particle size of the large particles (Dnl) is more than 200 nm.

In another embodiment of the conductive composite of the invention, the packing volume fraction of the small particles is from 10 to 15%, the packing volume fraction of the medium particles is from 0 to 10% and the packing volume fraction of the large particles in their non coalescent form is from 75 to 85%.

In another embodiment of the conductive composite of the invention, the particle size ratio defined by the number average polymer particle size of the large particles over the number average polymer particle size of the small particles, Dnl/Dns is from 15 to 3, preferably 5 to 10, more preferably 6 to 9.

In another embodiment of the conductive composite of the invention, the particle size ratio defined by the number average polymer particle size of the large particles over the number average polymer particle size of the medium particles, Dnl/Dnm is 3 to 1.2 preferably 1.8.

In another embodiment of the conductive composite of the invention, the difference between the maximum of two end peaks of the size distribution profile is in the range of 50 to 500 nm, preferably 150 to 300 nm.

In another embodiment of the conductive composite of the invention, the ratio of Dnl/Dns expressed in weight % is in the range of 95/5 to 5/95, preferably 90/10 to 50/50.

In another embodiment of the conductive composite of the invention, the polymer particles size are less than 1000 nm.

In another embodiment of the conductive composite of the invention, the nanotube-polymer composite has a percolation threshold of less than 0.5% carbon nanotubes in the composite.

In another embodiment of the conductive composite of the invention, the carbon nanotube-polymer composite comprises nanotubes in an amount less than about 10 wt % of the composite, preferably less than about 5 wt % of the composite, more preferably less than about 1 wt % of the composite, and particularly less than about 0.1 wt % of the composite.

The invention is also related to the use of the composite of the invention in the preparation of a transparent composite material, with a light transmission level over 80%.

DETAILED DESCRIPTION OF SPECIFIC EMBODIMENTS

The following terms are defined as follows:

Copolymer: A polymer having more than one different monomer, such as terpolymers and tetrapolymers. Copolymers can be linear or branched and include random, alternating, graft and block copolymers. For clarity and conciseness, the term "polymer" will be used to include homopolymers, copolymers and other polymers having more than one different monomer.

Polymer solution: A polymer solution comprising a polymer in an aqueous medium or a polymer in a solvent medium, wherein the polymer is generally in non-particulate form.

Water-soluble polymer: A polymer or copolymer that is generally water soluble. A water-soluble polymer may have some fraction of polymer in solution and some fraction in particulate or aggregate form, wherein the amount of polymer in solution and the amount of polymer in particulate form is dependent on the polymer concentration, liquid medium and ambient conditions.

Polymer dispersion: Polymer particles, generally in the range of about colloidal size to about 1000 microns distributed in a medium.

The particle size is defined as the number average polymer particle size Dn in nm.

Water-dispersible polymer: A polymer dispersible or suspendable in an aqueous medium, such as a polymer suspension or emulsion. The polymer is generally in the form of small particles that are in a suspension or dispersion that is stable or unstable, i.e. the polymer may be temporarily suspended by agitation.

Water-based polymer: A polymer that can be dispersed, suspended, emulsified or solubilized in an aqueous environment.

Polymer Suspension: A dispersion of solid polymer particles in a liquid medium, i.e. in an aqueous medium or solvent. The suspension may be stable for a long period of time or a short-lived suspension, i.e. stable or unstable. The suspension may be created and maintained by agitation.

Polymer Colloidal Suspension: A suspension or dispersion of solid polymer particles of a colloidal size. A polymer colloidal suspension is usually stable.

Polymer Emulsion: A dispersion of solid polymer particles, aggregates or particulates in a liquid state, generally an aqueous environment. The polymer particles can be of a colloidal size or larger, depending on the particular polymer type and the constituency of the liquid environment. The polymer particles in the emulsion can be stabilized by colloidal particles. An emulsion can be formed by mechanical agitation or by chemical processes (direct synthesis). The emulsion can be stable or unstable (i.e. An unstable emulsion will separate in time depending on temperature and conditions).

Polymer colloidal dispersion: A dispersion of polymer particles of colloidal size in a liquid medium.

The colloidal dispersion may contain hydrophobic colloids or hydrophilic colloids or a mixture of both.

Dispersions in which the particle size is in the colloidal range are colloidal emulsions or colloidal suspensions.

Latex: A polymer emulsion or sol in which each polymer particle contains a number of macromolecules. The particle size is generally colloidal and the liquid state is generally aqueous.

Polyelectrolyte: A macromolecular substance which, on dissolving in water or another ionizing solvent, dissociates to give polyions (multiply charged polycations or polyanions) together with an equivalent amount of ions of small charge and opposite sign.

Polyelectrolytes dissociating into polycations and polyanions, with no ions of small charge, are also possible. A polyelectrolyte can be a polyacid, a polybase, a polysalt or a polyampholyte. A polyelectrolyte can be considered colloidal if at least one of the ions is of colloidal size.

Stabilization: Stabilization of carbon nanotubes and/or polymer particles refers to mechanical means or chemical means for keeping the nanotubes and/or polymer particles physically suspended in a medium for a period of time. Mechanical means for stabilization include, but not limited to, stirring and other agitation techniques. Chemical means include chemical species that promote the suspension of the nanotubes and/or polymer particles, such as, but not limited to, various appropriate surfactants and polymers.

Non coalesced polymer particles: a polymer mixture which comprises distinct particles of polymer.

Coalesced polymer particles: a polymer mixture matrix wherein the distinct particles of polymer have disappeared and form a continue matrix.

Resistivity R is expressed in ohm·cm.

Conductivity is 1/R is expressed in siemens/cm.

Percolation Threshold: The critical concentration of conductive filler in a composite material where the composite material comprising the conductive filler transitions from an insulator to an electrical conductor.

In one embodiment, the invention relates to a conductive carbon nanotube-polymer mixture composite having electrical conductivity at a low carbon nanotube concentration or percolation threshold.

In preparing most carbon nanotube-polymer mixture composites, the objective has been to achieve a homogeneous dispersion of the nanotubes in the polymer mixture matrix.

In order to disperse the nanotubes in the polymer mixture matrix, melt blending and solvent-blending techniques have often been used to provide a fine dispersion both at the macroscopic and microscopic level. Hydrocarbon-based solvents in solvent-blending methods have also often been used to provide compatibility with a polymer mixture matrix system.

However, in contrast to previous methods, conductivity in the composite in some embodiments of the present invention is achieved by seeking a generally homogeneous dispersion at the macroscopic level with an inhomogeneous dispersion of nanotubes at the microscopic level.

Also, in contrast to conventional solvent and polymer melt blending techniques, a nanotube dispersion in one embodiment of the present invention is sought and prepared using the extremely hydrophobic nanotubes in an aqueous environment.

In some embodiments of the present invention, a connective network of nanotubes is formed by mixing a nanotube suspension with a suspension of polymer mixture particles, wherein the polymer particles substantially exclude the nanotubes from the interior of the polymer particles. To form the composite, water is removed from the nanotube-polymer mixture.

As water is removed, the polymer mixture particles coalesce with each other, trapping and aggregating the nanotubes in the interstitial regions between at least some of the coalesced polymer mixture particles generally toward the outer edges of the polymer particles.

The resulting composite comprises carbon nanotubes that are dispersed in the polymer mixture composite generally homogeneously at the macroscopic level and inhomogeneously at the microscopic level and form a connective network through the nanotube-polymer composite that branches in between at least some of the coalesced polymer mixture particles.

Another embodiment of the invention relates to a polymer composite comprising carbon nanotubes (single wall and/or multiwall) and a polymer mixture, wherein the polymer mixture composite comprises coalesced polymer mixture particles and carbon nanotubes, wherein the carbon nanotubes primarily reside between at least some of the coalesced polymer particles and form a conductive network through the nanotube-polymer composite.

The polymer mixture matrix before coalescence comprises particles of at least two populations of particles having a size distribution which is at least bimodal, preferably trimodal or more preferably multimodal.

In the polymer mixture matrix before coalescence each population of polymer particles is made with the same polymer or with different polymers.

In one embodiment, each particle is made with a mixture of polymer, for example with a core/shell polymer type.

In a preferred embodiment when each particle is made with a mixture of polymer for example a core/shell polymer type, all the populations of particles are made with the same mixture of polymer.

In another embodiment, when the size distribution is bimodal, trimodal, multimodal, the polymer mixture matrix comprises two, three, more than three different size of particles made respectively with two, three, multi different polymers.

Thus, the polymer mixture comprises several populations of polymer particles having different size particles when they are in the non coalescent form before the filmification step. The basic idea is to reach the higher packing volume fraction of particle as used in monitoring the viscosity of emulsion and dispersion (see references: Schneider and al Journal of applied polymer science Vol. 84, 1878-1896 and 1897-1915 (2002)).

Figure 3:
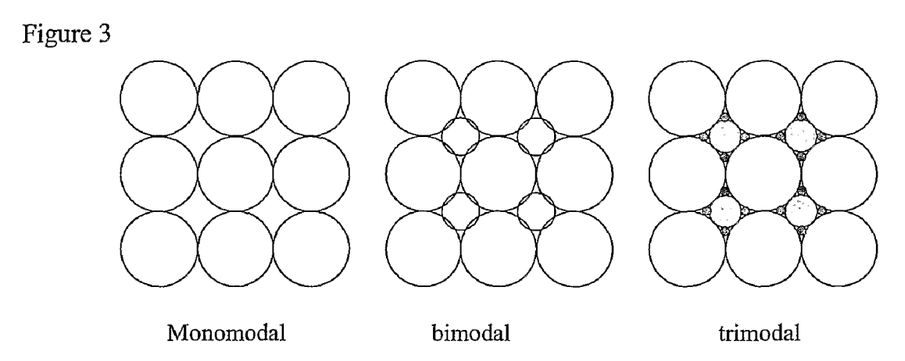
FIG. 3 shows the different structures for packing particles having different size distribution.

Thus, more the free volume is reduced, less nanotubes are needed to build up a connectivity within the system to get electrical conductivity (see FIG. 3).

The size of the polymer particles are less than 1000 nm.

When the mixture contains two particle sizes Ds and Dl (Ds: small particle size and Dl: large particle size) it is preferable to use a ratio Dl/Ds in between 3 and 15, more preferably in between 3 and 10 and more preferably in between 3 and 9.

For the trimodal distribution size (Dm: size of the medium particles) of the mixture, the following parameters and preferred parameters for the maximization of the packing volume fraction of particles are: Dl/Ds=10, Dl/Dm=1.8, and As demonstrated in the examples of the present invention, formulation can be performed around the ratios end proportion cited for the optimums without departing from the scope of the invention.

Moreover when two polymers are used, the difference of their particles sizes is preferably in the range of 100 to 500 nm, more preferably 200 to 300 nm.

This difference is calculated on the basis of the difference between the maximum of the two end peaks of the size distribution profile. The particle size is defined as the number average polymer particle size Dn and expressed in nanometers.

In another embodiment, the small particle size Ds is in the range of carbon nanotube diameter and the large particle size Dl is in the range of carbone nanotube length.

In a preferred embodiment the large polymer particle size is in the range of 200 to 1000 nm and the small polymer particle size is in the range of 20 to 150 nm.

In a specific embodiment, the weight ratio between the large size particle content and the small size particle content is in the range of 95/5 to 5/95, preferably 90/10 to 50/50.

In a preferred embodiment the % weight of the small size polymer particle is 10% and the % weight of the large size polymer particle is 90%.

Another embodiment of the invention relates to a method for making a conductive carbon nanotube composite comprising:
  (a) forming a polymer particles suspension which comprises the mixing in a solvent, preferably water, of at least two populations of particles having a size distribution which is at least bimodal;
  (b) forming a carbon nanotube suspension comprising carbon nanotubes and a solvent;
  (c) adding the carbon nanotube suspension in the polymer particles suspension, to form a carbon nanotube-polymer mixture suspension,
  (d) optionally mixing the resulting suspension with optional heating and
  (e) removing the solvent from the carbon nanotube-polymer suspension to form a carbon nanotube-polymer composite.

In a preferred embodiment, the method comprises forming an aqueous nanotube suspension comprising carbon nanotubes and water, mixing the nanotube suspension with an aqueous polymer particles suspension comprising at least two populations of particles having a size distribution which is at least bimodal and water to form a carbon nanotube-polymer mixture suspension, wherein the nanotubes are generally excluded from the interior of the polymer particles, and removing water from the carbon nanotube-polymer mixture suspension.

Thus a carbon nanotube-polymer mixture composite is formed, wherein the polymer mixture particles coalesce and the carbon nanotubes are trapped and aggregate primarily between at least some of the polymer mixture particles and wherein the carbon nanotubes form an interconnecting network in the nanotube-polymer composite, the network of which provides electrical and thermal conductivity to the composite.

For the control of the size distribution of the particles in step a) of the process above, it will be referred to publications on Seed lattices preparation (Schneider and al in Journal of applied polymer science Vol. 84, 1897-1915 (2002) and Kenna and al in Macromol. Symp. 2004, 286, 383-398). These references disclose processes for preparing bimodal emulsions which are essentially based on in situ nucleation steps, optionally in the presence of surfactants.

The carbon nanotubes can be single-wall carbon nanotubes, multi-wall carbon nanotubes or a combination thereof. The nanotubes can be made by any known process for making carbon nanotubes; however, the composition of the nanotube material can influence the conductivity of the nanotube-polymer composite.

For example, a nanotube material having more single-wall carbon nanotubes with respect to multi-wall carbon nanotubes and amorphous carbon, would be more conductive than a nanotube material with a lower concentration of single-wall carbon nanotubes in a similar mixture of multi-wall carbon nanotubes and amorphous carbon.

Typically, the carbon nanotube material comprises primarily single-wall carbon nanotubes (i.e. greater than 50 wt % of the carbon-containing material), preferably greater than 70 wt % of the carbon-containing material.

Carbon nanotubes can be made from any known means, such as by gas-phase synthesis from high temperature, high pressure carbon monoxide, catalytic vapor deposition using Carbon-containing feedstocks and metal catalyst particles, laser ablation, arc method, or any other method for synthesizing carbon nanotubes. carbon nanotubes obtained from synthesis are generally in the form of carbon nanotube powder.

In one embodiment, carbon nanotube powder is purified to remove non-nanotube carbon, such as amorphous carbon, catalyst support and metallic catalyst residues. The metallic impurities may also be oxidized through contact with air or by oxidation of the non-nanotube carbon during purification.

The carbon nanotubes can be used as-produced or after purification. Purification can be done by any known means such as those based on acidic treatment (sulphuric or nitric acids) or using oxidative gas process (WO 02/064,868) and any method known in the prior art.

After acid treatment, the acid and impurities are removed from the nanotubes by rinsing. The nanotubes can be rinsed with water, an organic solvent or a combination thereof.

A carbon nanotube suspension can be made in an aqueous environment using mechanical means, such as high shear mixing or sonication. Such a suspension would be unstable, in that the extremely hydrophobic nanotubes would settle out fairly rapidly. Although it is possible to use an unstable suspension of nanotubes in the present invention, a more stable suspension of nanotubes can be achieved with the use of a stabilizer.

Without functionalization or modification, carbon nanotube are generally hydrophobic. Other means to suspend carbon nanotubes include, but are not limited to, functionalization with other chemical moieties or physical modification, such as cutting or adsorption of compatibilizer.

However, chemical functionalization can often compromise nanotube conductivity. In fact, the conductivity of single-wall carbon nanotubes is reduced as a function of the amount of sidewall functionalization and the electron-withdrawing nature of the sidegroup. The more electron withdrawing the sidewall functionalization, the more the conductivity of the single-wall carbon nanotubes can decrease. Any chemical moiety that impedes electron flow along the nanotube axis can impair nanotube conductivity. Thus, multi wall carbon nanotubes are preferred since the sidewall allows functionalization and internal walls allow electron flow for conductivity.

In another embodiment, the carbon nanotube-polymer composite further comprises a conductive filler, such as, but not limited to, carbon black and small fullerenes, C60 (buckyballs), C70, C84 or combinations thereof. In this embodiment, the carbon nanotubes are mixed with one or more conductive fillers and suspended.

For clarity and conciseness, with or without the one or more conductive materials, a mixture of conductive material and nanotubes will be collectively referred to as the nanotubes or nanotube material.

Stabilizers can improve the stability of a carbon nanotube suspension and suitable stabilizers include, but are not limited to, surfactants, proteins and water-soluble polymers hydrophobic polymers, amphiphilic polymer as described in the patent WO2004/097853.

Satisfactory surfactants useful herein can readily be identified in well-known sources such as McCutcheon's Detergents & Emulsifiers. Suitable surfactants include, but are not limited to one or more surfactants selected from the group consisting of cationic surfactants, anionic surfactants, amphoteric surfactants, and non-ionic surfactants, and mixtures thereof.

Water-soluble polymers can also be used to stabilize a suspension of carbon nanotubes in an aqueous environment. Suitable water-soluble polymers are polymers that form polymer solutions in water.

The water solubility of a particular polymer depends on a number of factors, including, but not limited to, polymer composition, polymer molecular weight, the critical concentration of the polymer, temperature and pressure.

The critical concentration (Cent) of the polymer is the highest concentration where polymer coils can still reach their maximum extension in volume.

Generally, preferred carbon nanotube stabilizers are water-soluble polymers that can form true solutions in water, rather than suspensions of polymer particulates.

Thus, although these water-soluble polymers may be available in particulate form at certain concentrations and polymer molecular weight, the preferred water-soluble polymer for stabilizing the nanotube suspension is at a concentration in the aqueous media where the polymer is generally in the form of individual extended polymer chains.

Suitable water-soluble polymers for stabilization of the nanotube suspension include, but are not limited to, amphiphilic polymers, also called polymer surfactants, which contain both hydrophobic and hydrophilic segments, cellulosic polymers, polyelectrolytes, ionic polymers, acrylate polymers, acrylic acid polymers, copolymers thereof and combinations thereof.

Suitable specific water-soluble polymers include, but are not limited to, Gum Arabic, poly (vinyl pyrrolidone), poly (vinyl alcohol), poly (acrylic acid), poly (methacrylic acid), sodium polyacrylate, polyacrylamide, poly (ethylene oxide), polyethylene glycol, poly (ethylene formamide), polyhydroxyether, poly (vinyl oxazolidinone), methyl cellulose, ethyl cellulose, carboxymethyl cellulose, ethyl (hydroxyethyl) cellulose, sodium polyacrylate, copolymers thereof, and combinations thereof.

Other suitable water-soluble polymers for stabilizing aqueous nanotube suspensions include, but are not limited to, polystyrene sulfonate (PSS), poly (1-vinyl pyrrolidone-co-vinyl acetate), poly(1-vinyl pyrrolidone-co-acrylic acid), poly (1-vinylpyrrolidone-co-dimethylaminoethyl methacrylate), polyvinyl sulfate, poly (sodium styrene sulfonic acidco-maleic acid), dextran, dextran sulfate, gelatin, bovine serum albumin, poly (methyl methacrylate-co-ethyl acrylate), polyallyl amine, and combinations thereof.

Preferable water-soluble polymers for stabilizing aqueous carbon nanotube suspensions are Gum Arabic (GA) and poly (vinyl pyrrolidone), more preferably Gum Arabic.

Hydrophobic or amphiphilic polymers can also be used to stabilize suspension of carbon nanotubes in non aqueous environment. The solvent solubility of a particular polymer depends on a number of factors, including, but not limited to, polymer composition, polymer molecular weight, the critical concentration of the polymer, temperature and pressure.

The critical concentration (Cent) of the polymer is the highest concentration where polymer coils can still reach their maximum extension in volume.

Generally, preferred carbon nanotube stabilizers are solvent-soluble polymers that can form true solutions in solvent, rather than suspensions of polymer particulates. Thus, although these solvent-soluble polymers may be available in particulate form at certain concentrations and polymer molecular weight, the preferred solvent-soluble polymer for stabilizing the nanotube suspension is at a concentration in the solvent media where the polymer is generally in the form of individual extended polymer chains.

The main idea here is to disperse carbon nanotube thanks to the polymer-carbon nanotube interaction such as wrapping, pi-stacking, hydrogen interaction, (see Zyvex EP1359121A2).

When the polymer is in the particulate form in a given solvent, it is preferred to use at least an A-B polymer structure where one component is soluble in the solvent and the other not soluble or if so it has higher affinity with carbon nanotube than with the solvent.

This is the same way when an amphiphilic polymer is used to disperse CNT in aqueous environment. Other polymer structure can be used such as A-B-A, A-B-C (for example polystyrene-b-polyisoprene-b-polystyrene SIS, polystyrene-b-polybutadiene-b-polystyrene SBS, polymethylmethacrylate-b-polybutylacrylate-b-polymethylmethacrylate, polystyrene-b-polybutadiene-b-polymethylmethacrylate SBM A-B-C . . . .

Generally, carbon nanotube stabilizers (water soluble or solvent soluble polymer, surfactants, proteins, . . . ) can be attached covalently to the side wall nanotube. This can be obtained by in-situ polymerization or by post-treatment.

The particular selection of the type of stabilizer, such as the type of surfactant or polymer (water or solvent soluble) and the particular compound selected, for any given application can be made by those of ordinary skill in this art with reference to the intended application and the desired properties of the final product.

Typically, the amount of stabilizer can range from about 1 wt % to about 200 wt % of the weight of the nanotubes.

Preferably the amount of stabilizer is in the range of about 5 wt % and about 100 wt % of the weight of the nanotubes.

Mechanical means can be used to suspend the nanotubes, with or without a stabilizer. Suitable mechanical means include, but are not limited to, high speed impeller mixing, high shear mixing and sonication.

Heat can also be applied to facilitate nanotube suspension.

The main components of the conductive polymer mixture composite are known as the polymer mixture matrix.

In one embodiment of the present invention, the polymer mixture matrix is formed from a polymer mixture in the form of polymer mixture particles suspended in an aqueous system, such as a polymer emulsion or latex.

The polymer mixture particles are preferably able to coalesce as moisture is removed from the water-based or solvent based suspension. Suitable polymer mixture include but are not limited to combination of acrylate polymers, acrylic acid polymers, polyacrylic esters, polyacrylamides, polyacrylonitriles, chlorinated polymers, fluorinated polymers, styrenic polymers, polyurethanes, natural rubber, synthetic rubber polymers, vinylchloride-acrylate polymers, copolymers thereof.

Some examples of specific suitable polymer mixture, include, but are not limited to combinations of poly (vinyl acetate), poly (acrylic acid), poly (methyl methacrylate), polyacrylamide, polyacrylonitrile, polyvinylpropionate, polystyrene, polytetrafluoroethylene, poly (vinyl chloride), poly (vinylidene chloride), poly (vinyl chloride-ethylene), poly (vinyl chloride-propylene), poly (styrene-co-butadiene), styrene-acrylate copolymers, ethylene-vinyl chloride copolymer, poly (vinyl acetate-acrylate), poly (vinyl acetate-ethylene).

In a preferred embodiment, the polymers used in the invention are a core/shell like structure. The polymer core is a crosslinked elastomeric composition such as styrene-butadiene, styrene-butylacrylate. The polymer shell is made of long chains of (co)polymer such as polyacrylamide, polymethylmethacrylate (PMMA) and copolymer of PMMA. In the presence of solvent, the shell is extended for receiving the NTC and the crosslinked core is maintained unchanged. The shell (co)polymer may contains reactive species to build up covalent attachments to CNT or the final host product. This is well known in the thermoplastics reinforcement field.

Examples of core/shell polymers are those produced and sold by Arkema as Durastrength and Clearstrength.

The polymer particles core can comprise ordered polymer structures, such as, but not limited to, lamella, micelles, cylinder, sphere, . . . and/or crystalline-packed polymers.

The particular polymer and associated molecular weight will depend on the desired end-use application. The polymer molecular weights of the shell can range from about 4,000 g/mole to over 1,000,000 g/mole.

The suspension of the polymer mixture particles can be stable or unstable. Preferably, the polymer particle suspension is stable. An example of an unstable polymer suspension is one in which the polymer particles settle out in a relatively short time, e.g. within an hour.

An unstable suspension can be stabilized by mechanical means, such as by stirring, high shear mixing or sonication, to keep the polymer particles suspended for a period of time effective to add and mix with the nanotube suspension, so that the polymer particles and the nanotubes are dispersed fairly homogeneously at the macroscopic level throughout the liquid phase.

An aqueous suspension of polymer mixture particles can also comprise a stabilizer for the polymer particles.

Examples of polymer particle stabilizers, include, but are not limited to surfactants and polymers.

Surfactants for polymer particle stabilization can be cationic, anionic, nonionic or amphoteric.

Generally, the type of surfactant is dependent on the type of polymer and the polymerization process used. Any of the surfactants listed above for nanotubes can be used for polymer particle stabilization.

Examples of anionic surfactants for polymer particle stabilization include, but are not limited to, alkyl sulfates, such as sodium lauryl sulfate, ammonium lauryl sulfate, sodiumisotridecyl sulfate, sodium dodecyl sulfate, sodium octyl sulfate, sodium cetyl stearyl sulfate, and sodium oleyl sulfate, alkyl ether sulfates, such as sodium lauryl ether sulfate, alkyl phenol ether sulfates, such as sodium nonyl phenol ether sulfate, salts and free acids of phosphate esters, sulfosuccinates, such as sodium sulfosuccinate alcohol ethoxylate, sodium sulfosuccinate alkyl phenol ethoxylate, sodium dicyclohexyl sulfosuccinate, and sodium dioctyl sulfosuccinate.

Examples of nonionic surfactants for polymer particle stabilization include, but are not limited to, alkyl ethoxylates, alkyl ethoxylate blends and alkyl phenol ethoxylates. Fatty acid soaps and proteins can also be used to stabilize polymer particles. For example, rubber particles in natural rubber latex, which comes from the sap of the Hevea Brasiliensis tree, can be stabilized in a water-based system by proteins and fatty acid soaps.

The polymer particles can also be stabilized with one or more water-soluble polymers. The water-soluble polymer for stabilizing the polymer particles can be the same or different than the water-soluble polymer used to stabilize the nanotube suspension.

Suitable water-soluble polymers for stabilizing polymer particle suspensions include, but are not limited to, amphiphilic polymers, also called polymer surfactants and which contain both hydrophobic and hydrophilic segments, cellulosic polymers, polyelectrolytes, ionic polymers, acrylate polymers, acrylic acid polymers, copolymers thereof and combinations thereof.

Suitable specific water-soluble polymers include, but are not limited to, Gum Arabic, poly (vinyl pyrrolidone), poly (vinyl alcohol), poly (acrylic acid), poly (methacrylic acid), sodium polyacrylate, polyacrylamide, poly (ethylene oxide), polyethylene glycol, poly (ethylene formamide), polyhydroxyether, poly (vinyl oxazolidinone), methyl cellulose, ethyl cellulose, carboxymethyl cellulose, ethyl (hydroxyethyl) cellulose, sodium polyacrylate, copolymers thereof, and combinations thereof.

Other suitable water-soluble polymers for stabilizing aqueous polymer particle suspensions include, but are not limited to, polystyrene sulfonate (PSS), poly(1-vinyl pyrrolidone-co-vinyl acetate), poly (1-vinyl pyrrolidone-co-acrylic acid), poly (1-vinyl pyrrolidone-co-dimethylaminoethyl methacrylate), polyvinyl sulfate, poly (sodium styrene sulfonic acid-co-maleic acid), dextran, dextran sulfate, gelatin, bovine serum albumin, poly (methyl methacrylate-co-ethyl acrylate), polyallyl amine, and combinations thereof.

A preferable water-soluble polymer for stabilizing a poly (vinyl acetate) suspension is polyvinyl alcohol.

In the following a term liquid system will be used for water and solvent system. Also, dispersion will mean suspension in water and in solvent.

The nanotube dispersion is mixed with the polymer mixture particle dispersion. The mixing can be optionally accompanied by heating. Water is then removed to form a nanotube-polymer mixture composite. Water or solvent can be removed by evaporation or desiccation and facilitated by application of vacuum and/or heat. As the suspending liquid system evaporates from the nanotube-polymer dispersion, the polymer mixture particles coalesce, and since the nanotubes are essentially excluded from the interior of the polymer particles, the nanotubes are trapped and aggregate between at least some of the polymer particles in the interstitial region. The trapped nanotubes form an interconnecting network of nanotubes in the polymer matrix, wherein the nanotube network provides the composite with electrical and thermal conductivity.

The particular stabilizer used to stabilize the nanotube dispersion can affect the conductivity of the nanotube-polymer composite. For example, when poly (vinyl pyrrolidone) (PVP) is used as a stabilizer for single-wall carbon nanotubes, the polymer can wrap around and coat individual nanotubes and, to some extent, ropes of single-wall carbon nanotubes. (See M. O'Connell, et al., Chem. Phys. Lett. 342 (2001) p. 265-271).

PVP is a very good stabilizer for single-wall carbon nanotubes in aqueous systems. However, in a PVP-stabilized nanotube-polymer composite, where the polymer is poly (vinyl acetate), the conductivity of the composite is lower than a comparably-made composite, where the nanotube stabilizer is Gum Arabic. Gum Arabic, a water-soluble polysaccharide produced by Acacia Senegal trees, also appears to be a very good stabilizer for carbon nanotubes, both single-wall and multiwall. (For information on GA-stabilized SWNT, see R. Bandyopadhyaya, et al., Nano Lett., 2 (2002) p. 25.)

The present invention provides a conductive polymer composite wherein conductivity is achieved with very low concentrations of carbon nanotubes, i.e. at low percolation thresholds of carbon nanotubes. The amount of carbon nanotubes needed to provide a level of electrical conductivity.

In one embodiment, the invention comprises a conductive carbon nanotube-polymer mixture composite, wherein the polymer is a mixture of 300 nm core/shell polymer and 80 nm core/shell polymer wherein the nanotubes are multi-wall carbon nanotubes and wherein the nanotube-polymer composite has a percolation threshold of less than about 0.5 wt % multi-wall carbon nanotubes in the composite.

The polymer particles forming the polymer matrix of the nanotube polymer mixture composite are generally spherical with a core/shell structure having an average particle size Dn in the range of carbon nanotube diameter for the smallest size and in the range of carbon nanotube length for the largest particle size.

The nanotube network provides electrical and thermal conductivity to the composite. Because the polymer particles occupy a volume in the composite wherein the nanotubes are essentially excluded, the composite is conductive and has a percolation threshold at very low carbon nanotube loadings.

These low loading are dependent on the homogeneity of the composite, the polymer mixture particles size distribution, the carbon nanotube exfoliation and their aspect ratio (length to diameter). The higher the packing volume fraction of particles, the lower is the loading of CNT for percolation.

During the coalescence of the polymer mixture particles, the nanotubes become entrapped between at least some of the coalescing polymer particles. As the liquid medium is removed and the polymer mixture particles coalesce, the entrapped nanotubes become enveloped with polymer shell.

In one embodiment, the matrix polymer mixture particles, which generally exclude nanotubes from their polymer-occupied interior so that the nanotubes reside primarily between the polymer mixture particles, exclude nanotubes from more than 60 vol % of the composite material.

For the nanotubes to reside primarily between or, in the alternative, be substantially excluded from the polymer mixture particles, the nanotubes would be excluded from at least about 60 vol % of the composite material. Preferably, the polymer mixture particles exclude the nanotubes from more than 70 vol % of the composite, more preferably the polymer mixture particles exclude the nanotubes from more than 80 vol % of the composite, more preferably the polymer mixture particles exclude the nanotubes from more than 85 vol % of the composite, more preferably the polymer mixture particles exclude the nanotubes from more than 90 vol % of the composite, more preferably the polymer mixture particles exclude the nanotubes from more than 95 vol % of the composite, more preferably the polymer mixture particles exclude the nanotubes from more than 99 vol % of the composite.

Generally, a lower concentration of nanotubes is needed to form conductive networks in a polymer matrix made with polymer mixture particles that exclude the nanotubes from a larger volume of the composite matrix.

This is achieved by increasing the packing volume fraction.

The concentration of nanotubes needed to form a conductive nework with nanotube-excluding polymer particles is substantially less than if the nanotubes were uniformly dispersed throughout the entire polymer composite as used when the polymer and carbon nanotubes are mixed in the molten state or real solution.

Carbon nanotubes in a concentration range from about 0.01 wt % to about 20 wt % of the dried polymer matrix material can be incorporated into a nanotube-polymer mixture composite.

Generally, the amount of nanotubes in the nanotube-polymer composite is sufficient to achieve electrical and thermal conductivity, but desirably small, so as to retain the mechanical, optical, surface aspect, and processing properties of the polymer.

Preferably, the nanotube material is less than about 20 wt % of the polymer matrix material, more preferably, less than about 10 wt % of the polymer matrix material, more preferably, less than about 5 wt % of the polymer matrix material, and more preferably less than about 3 wt % of the polymer matrix material.

The polymer particles can comprise ordered polymer structures, such as, but not limited to, lamella, micelles, cylinder, sphere, and/or crystalline-packed polymers.

The particular polymer and associated molecular weight will depend on the desired end-use application. If the polymer is not crosslinked, the molecular weights can range from between about 4,000 or 5,000 g/mole to over 1,000,000 g/mole.

In another embodiment, a conductive carbon nanotube-polymer mixture composite can be made by forming a solvent-based carbon nanotube suspension, mixing the carbon nanotube suspension and an aqueous polymer suspension, wherein the polymer is in a form of polymer mixture particles, to form an carbon nanotube-polymer mixture suspension, and removing water and solvent from the carbon nanotube-polymer suspension to form a carbon nanotube-polymer mixture composite, wherein polymer mixture particles coalesce and the carbon nanotubes reside primarily between the polymer particles.

In this embodiment, the nanotube suspension is made with a solvent. Any solvent that can suspend carbon nanotubes can be used. The suspension can be stable or unstable. Mechanical means can also be used to promote the suspension of the nanotubes.

Suitable solvents for carbon nanotubes, and in particular, multi-wall carbon nanotubes, include, but are not limited to, amides, such as N,N-dimethylformamide (DMF), N-methylpyrrolidone (NMP), dimethylacetamide (DMAc), and hexamethylphosphoramide, toluene, dimethylsulfoxide (DMSO), cyclopentanone, tetramethylene sulfoxide, s-caprolactone, acetone, methylethylketone, and combinations thereof. Any other solvent or combination of solvents that can suspend carbon nanotubes can be used.

The carbon nanotube suspension is mixed with a polymer mixture suspension to form a carbon nanotube-polymer mixture suspension. The polymer suspension is comprised of polymer and water, and the polymer is in a form of polymer mixture particles that essentially exclude the carbon nanotubes from entering into the particles. The polymer can be any polymer that can be suspended in particle form in an aqueous suspension, such as those mentioned above. The polymer particles may also be stabilized in the aqueous environment by any stabilizer mentioned above to stabilize polymer suspensions.

Although not meant to be limited by theory, when the nanotubes are in a solvent and added to the aqueous polymer mixture suspension, the hydrophobic nanotubes tend to be attracted to, and accumulate on, the generally hydrophobic polymer particles in preference to being in the water-phase of the polymer suspension.

In contrast to the method wherein an aqueous nanotube suspension is used with an aqueous polymer suspension and the trapping of the nanotubes between the polymer particles is generally a physical phenomenon, in the embodiment wherein the nanotubes are in a solvent suspension, the nanotubes accumulation at the polymer particle surface also involves solvent/non-solvent attractive and repulsive forces.

After the solvent-based nanotube suspension and water-based polymer suspension are mixed to form a carbon nanotube-polymer mixture suspension, the water and solvent are removed from the carbon nanotube-polymer suspension to form a carbon nanotube-polymer composite, wherein polymer particles coalesce and the carbon nanotubes reside primarily between the polymer particles. Although not meant to be held by theory, the solvent can enhance the coalescing of the polymer particles by swelling the outside of the polymer particles. The removal of solvent and water can be by any known means of solvent and water removal, such as those means listed above.

In another embodiment of the invention, a carbon nanotube-polymer mixture composite, comprises forming a solvent-based nanotube suspension, mixing the nanotube suspension with a solvent-based polymer suspension to form a carbon nanotube-polymer mixture suspension, wherein the polymer is in a form of particles and wherein the nanotubes are generally excluded from entering into the polymer mixture particles, and removing solvent from the carbon nanotube-polymer suspension wherein the polymer mixture particles coalesce and the carbon nanotubes are trapped between the polymer mixture particles and form an interconnecting network providing the polymer composite with electrical conductivity.

In this embodiment, the solvent-based carbon nanotube suspension can be based on solvents cited above or any solvent known to suspend carbon nanotubes. The suspension can be stable or unstable. Mechanical means, such as sonication or vigorous mixing, can also be used to promote the suspension of the nanotubes.

The suspension of polymer mixture particles can be in the same solvent or a different solvent than that of the nanotube suspension. The polymer mixture particles can be suspended in any suitable solvent, preferably a solvent that does not dissolve the polymer particles, and, more preferably, a solvent that does not substantially swell the polymer particles, and more preferably, a solvent that does not substantially penetrate into the polymer particles.

The conductive polymer composite can be obtained from the dry state of the polymer and carbon nanotube (as produced, purified or functionalized) The solid polymer can be obtained by spray drying or coagulation/precipitating the emulsion or dispersion polymer.

The final form may be powder or granulate. Carbon nanotube can be in the form of as produced or removed from any state necessitated for purification, treatment or functionalization.

The solid forms thus obtained for the polymer and carbon nanotube can be melt blended using any known system as single or double extruder, internal mixer, and generally any tools leading to good dispersion of CNT into the polymer. The two solid states component of the composite can be re-dispersed in a liquid system water based or solvent based and recovered as explained below. Carbon nanotube-polymer composite can be obtained by dispersing one component of the composite and introducing directly the second component into the suspension.

For example, one can forms a suspension of the polymer or use the native dispersion (direct polymerization emulsion) and add directly the carbon nanotube to the said dispersion. The water is removed from the carbon nanotube-polymer mixture suspension to form a carbon nanotube-polymer composite, wherein polymer mixture particles coalesce and the carbon nanotubes reside primarily between the polymer particles.

In another example, toluene can be used to form a polymer suspension of poly (vinyl acetate) particles. Toluene can also be used to form a nanotube suspension. Thus, toluene would be a suitable solvent for a nanotube suspension and polymer mixture particle suspension. After mixing the two suspensions to form a carbon nanotube-polymer mixture suspension, the solvent (or solvents) is removed from the carbon nanotube-polymer mixture suspension to form a carbon nanotube-polymer composite, wherein polymer mixture particles coalesce and the carbon nanotubes reside primarily between the polymer particles.

In another example, toluene can be used to form a dispersion of latex powder obtained by spray drying a polymer emulsion. Carbon nanotube powder or granulate is added to the said dispersion using a suitable tools for dispersion as high shear mixer, sonicator.

Toluene is removed from the carbon nanotube-polymer mixture suspension to form a carbon nanotube-polymer composite, wherein polymer mixture particles coalesce and the carbon nanotubes reside primarily between the polymer particles.

The conductive polymer composites comprising carbon nanotubes and coalesced polymer mixture particles of the present invention have enhanced electrical and thermal conductivities which make them useful in applications that require thermal conduction, electrical conduction, electromagnetic shielding, or combinations thereof.

Such compositions are useful in paints, coatings, and adhesives because only a small concentration of nanotubes are needed to form conductive networks in the polymer matrix comprised of polymer particles that essentially exclude the nanotubes, electrical and thermal conductivity is imparted to the composite while not degrading the desired physical and mechanical processing properties of the matrix polymer.

The network of carbon nanotubes may additionally provide enhanced strength, elasticity, and toughness to the polymer composite.

In a thin film application, the lower concentration of carbon nanotubes allows a production of transparent coating. The light transmission can be over 80%.

When the polymer composite comprising carbon nanotube and polymer mixture particle is obtained by melt blending, other application can be reachable. Indeed, the composite blend can be pelletized and processed as it is or blended with other material using any known tools such as injection, extrusion, spinning.

The final conductive materials may be used in car body, packaging, audio video covers, fibres . . . .

The network of carbon nanotubes may additionally provide enhanced strength, elasticity, and toughness to the polymer composite.

When blended with other material such as thermoplastic, the score/shell structure of the polymer along with the crosslinking level of the core offer the possibility to fine tune the desired mechanical, optical, surface finish, electrical, thermal, performances.

Moreover, lowering the level of CNT keeping the conductivity will leads to transparent composite materials with a light transmission level over 80%.

At least bimodal particle distribution of the polymer mixture is preferred. The main rule is the reduction of the free volume in between particles (high packing volume fraction) Thus, the free volume connectivity leads to CNT connectivity and so to electrical conductivity with low CNT %. FIG. 3 describes the concept for a bimodal and trimodal particle size distribution.

Moreover, the polymer mixture may contain two different composition having different mechanical properties. Thus, the final performances needed, can be easily reachable since the formulation parameters are increased: percentage, particle size and nature of the polymer mixture components, crosslinking levels, core/shell ratio, shell molecular weight, carbon nanotubes concentration.

The following examples are included to demonstrate preferred embodiments of the invention.

EXAMPLES

The polymers used below were powder obtained by spray drying emulsions. They were prepared according to standard emulsion processes well known in the art of thermoplastics impact modifiers as those designed for PMMA, PVC reinforcement.

The polymers used in the invention are a double layer latex type having a core/shell structure. These structures are well known as soft/hard impact modifiers.

The polymer core is made of a crosslinked elastomeric composition such as butylacrylate/styrene or styrene/butadiene and the shell is made of grafted long chains of PMMA onto the elastomeric core.

The physical and chemical properties of the latex (crosslinking level of the core, monomer natures, weight percentage of the shell, layers number . . . ) depend on the final application in term of mechanical, optical, thermal, ageing and other properties.

The crosslinking of the core is preferable when using a solvent-based dispersion. Thus the particle integrity is maintained. Depending on the polymer core solubility in the solvent, swelling may happen.

Thanks to this core crosslinking, the polymer-carbon nanotube composite can be obtained from a lot of solvents even if they are good solvent of the core.

It is well known that adding fillers and particularly CNT to polymer leads to brittle mechanical behaviour. Thus, for mechanical reinforcement the polymer of the present invention used as an additive is a way to get high mechanical properties in term of modulus, elongation and toughness compromise. The multi-layers latex structure for example soft/hard or hard/soft structure may be used to achieve the desired compromise.

The core/shell structure when dispersed in an appropriate solvent, the shell extends allowing free volume for carbon nanotube to interact with the shell.

This opened shell/CNT structure is preferable for good coalescence and entanglement of the shells. That way, mechanical load transfer is achieved leading to high mechanical performances.

The carbon nanotubes used below are multi wall carbon nanotube produced by conventional CVD processes using a catalyst. They have a diameter in between 5 and 70 nm and an aspect ratio greater than 5. Preferably, the aspect ratio is greater than 50 and more preferably greater than 100.

The particle size is measured by Photon Correlation Spectroscopy (PCS) according to ISO 13321 with a ZETASIZER 5000 apparatus.

Methods of the Composite Preparation and Electrical Resistivity Measurement.

Latex powder is added to toluene. This dispersion is maintained one night under magnetic steering at room temperature. Depending on the concentration of CNT needed in the composite, a given amount of multi-wall carbon nanotube is added to the dispersion under magnetic steering with the help of sonication during 30 min.

A given amount of the new dispersion thus obtained is versed into silicone mold for film formation. The sample is maintained during 48 h in an oven under air recirculation at room temperature for toluene evaporation. The solid composite film thus obtained was compressed at 180° C. to recover the residual solvent and achieve a homogeneous film thickness.

Electrical resistivity was measured using two different tools. When resistivity is higher than 1 mega ohm·cm, a dielectric system is used in the frequency sweep mode. Below 1 mega ohm·cm a four lines probe is used.

Example 1

Reference

This example demonstrates a method for making a nanotube-polymer composite comprising MWCNT and a core/shell latex polymer.

This latex, referenced as L300 was produced by classical emulsion polymerization and spray dried. The core of L300 particle has a diameter of 272 nm and is made of crosslinked styrene/butyl acrylate. The shell is made of polymethylmethacrylate and represents 30% wt of the latex particle.

The particle size of L300 is 300 nm

The polymer latex L300 and MWCNT dispersion was obtained as follow: 5 g of L300 was suspended in 30 g of toluene. Different amounts of MWCNT were added directly to the suspension following the procedure described bellow. The solid contain of L300 emulsion is 40 wt %. The number average polymer particle size (Dn) was 300 nm (0.300 micron).

Example 2

References

This example demonstrates a method for making a nanotube-polymer composite comprising MWCNT and a core/shell latex polymer.

This latex, referenced as L80 was produced by classical emulsion polymerization and spray dried. The core of L80 particle has a diameter of 80 nm and is made of crosslinked styrene/butyl acrylate. The shell is made of polymethylmethacrylate and represents 20% wt of the latex particle.

The polymer latex L80 and MWCNT dispersion was obtained as follow: 3 g of L80 was suspended in 50 g of toluene. Different amounts of MWCNT were added directly to the suspension following the procedure described bellow.

The solid contain of L80 is 40% wt. The number average polymer particle size (Dn) was 80 nm (0.080 micron).

Example 3

Invention

This example demonstrates a method for making a nanotube-polymer composite mixture comprising MWCNT and a blend of L300 and L80.

90% wt of L300 powder and 10% wt of L80 powder were dry blended and 5 g of the blend was added to 50 g toluene. Different amount of MWCNT were added to the dispersion thus obtained. The film preparation follows the procedure described bellow. The wt % ration of L300 and L80 was calculated with the aid of the formulas given bellow. The objective is the maximization of the packing volume fraction of particle.

From the particle size distribution of L300 and L80, the difference between the two peaks maxima of the size distributions was 220 nm.

Figure 1:
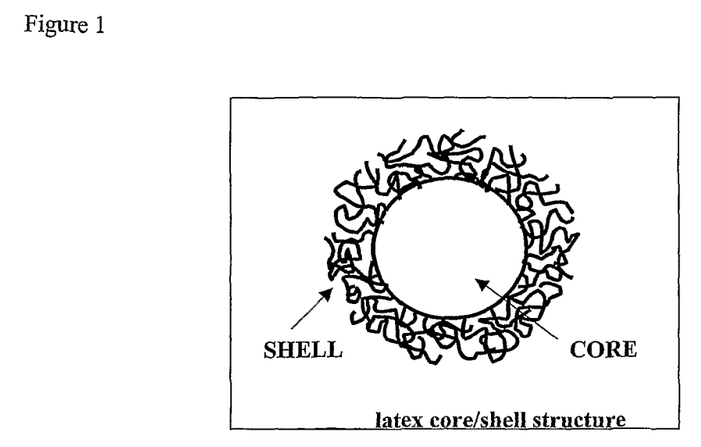
FIG. 1 describes the core/shell structure of polymer particle.

FIG. 1 is an illustration of the core/shell structure of the polymer used in the present invention.

Figure 2:
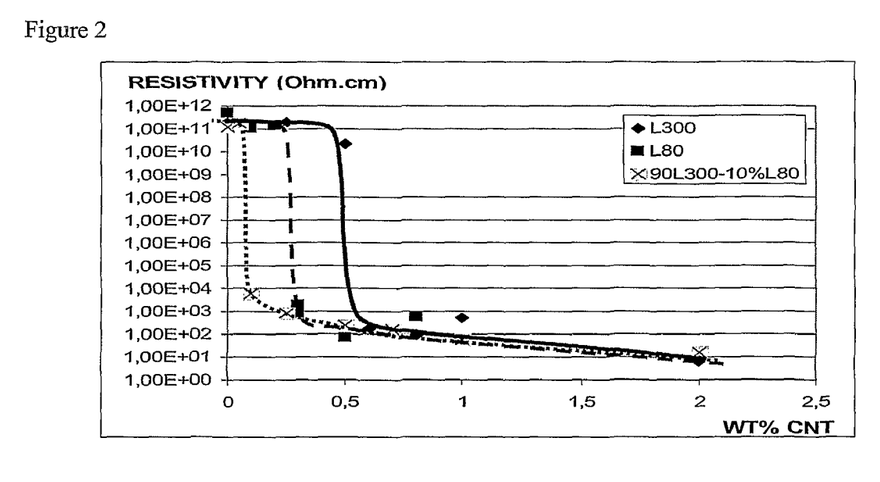
FIG. 2 gives the resistivity curves of two reference composites (ex. 1 and 2) compared with the resistivity curve of a composite of the invention (ex. 3).

FIG. 2 gives the resistivity curves of the two references composite (ex. 1 and 2) compared with the electrical resistivity curve of the composite of the invention (ex. 3).

These curves show the surprising synergy effect of the composite of the invention over the composite which contain a single polymer with the smallest monomodal size.

The invention claimed is:

1. A method for making a conductive carbon nanotube composite comprising:
   (a) forming a core/shell polymer particle suspension by mixing in a first solvent at least two populations of particles having a size distribution which is at least bimodal;
   (b) forming a carbon nanotube suspension comprising carbon nanotubes and a second solvent; adding the carbon nanotube suspension to the core/shell polymer particle suspension, to form a carbon nanotube-core/shell polymer mixture suspension, optionally mixing the resulting carbon nanotube-core/shell polymer mixture suspension,
   (e) optionally heating the resulting carbon nanotube-core/shell polymer mixture suspension and
   (f) removing the first solvent and the second solvent from the carbon nanotube-core/shell polymer suspension to form a carbon nanotube-polymer composite.

2. The method of claim 1 wherein said polymer particles suspension is in the form of non coalesced polymer particles.

3. The method of claim 1 wherein each particle of said core/shell polymer particles suspension is a polymer mixture.

4. The method of claim 1 wherein each of said two populations of polymer particles comprises a different polymer.

5. The method according to claim 1 wherein at least one of said populations of particles is selected from acrylate polymers, acrylic acid polymers, polyacrylic esters, polyacrylamides, polyacrylonitriles, chlorinated polymers, fluorinated polymers, styrenic polymers, polyurethanes, natural rubber, synthetic rubber polymers, vinylchloride-acrylate polymers, or copolymers thereof.

6. The method according to claim 1 wherein at least one of said populations of particles is selected from the group consisting of polystyrene-b-polyisoprene-b-polystyrene (SIS), polystyrene-b-polybutadiene-b-polystyrene (SBS), polymethylmethacrylate-b-polybutylacrylate-b-polymethylmethacrylate, polystyrene-b-polybutadiene-b-polymethylmethacrylate (SBM), poly (vinyl acetate), poly (acrylic acid), poly (methyl methacrylate), polyacrylamide, polyacrylonitrile, polyvinylpropionate, polystyrene, polytetrafluoroethylene, poly (vinyl chloride), poly (vinylidene chloride), poly (vinyl chloride-ethylene), poly (vinyl chloride-propylene), poly (styrene-co-butadiene), styrene-acrylate copolymers, vinyl ethylene-vinyl chloride copolymer, poly (vinyl acetate-acrylate), and poly (vinyl acetate-ethylene).

7. The method according to claim 1 wherein the polymer core is a cross linked elastomeric composition selected from the group consisting of styrene butadiene, and styrenebutylacrylate and the polymer shell is a long chain of (co)polymer selected from the group consisting of polyacrylamide, polymethylmethacrylate and copolymer thereof.

8. The method according to claim 1 wherein the size distribution is bimodal, comprising small and large particles, and wherein the number average polymer particle size of the small particles (Dns) is in the range of 20 to 100 nm and the number average polymer particle size of the large particles (Dnl) is in the range of 200 to 500 nm.

9. The method according to claim 8 wherein the particle size ratio defined by the number average polymer particle size of the large particles (Dnl) over the number average polymer particle size of the small particles (Dns), is from 15 to 3.

10. The method according to claim 8 wherein the ratio defined by the number average polymer particle size of the large particles (Dnl) over the number average polymer particle size of the small particles (Dns), expressed in weight % is in the range of 95/5 to 5/95.

11. The method according to claim 8 wherein the particle size ratio defined by the number average polymer particle size of the large particles (Dnl) over the number average polymer particle size of the small particles (Dns), is from 5 to 10.

12. The method according to claim 8 wherein the particle size ratio defined by the number average polymer particle size of the large particles (Dnl) over the number average polymer particle size of the small particles (Dns), is from 6 to 9.

13. The method according to claim 8 wherein the ratio defined by the number average polymer particle size of the large particles (Dnl) over the number average polymer particle size of the small particles (Dns), Dnl/Dns expressed in weight % is in the range of 90/10 to 50/50.

14. The method according to claim 1 wherein the size distribution is trimodal, comprising small, medium and large particles, and wherein the number average polymer particle size of the small particles (Dns) is below 120 nm, the number average polymer particle size of medium particles (Dnm) is from 120 to 200 nm and the number average polymer particle size of large particles (Dnl) is more than 200 nm.

15. The method according to claim 14 wherein the packing volume fraction of the small particles is from 10 to 15%, the packing volume fraction of the medium particles is from 0 to 10% and the packing volume fraction of the large particles in their non coalescent form is from 75 to 85%.

16. The method according to claim 14 wherein the particle size ratio defined by the number average polymer particle size of the large particles (Dnl) over the number average polymer particle size of the medium particles (Dnm), is 3 to 1.2.

17. The method according to claim 14 wherein the particle size ratio defined by the number average polymer particle size of the large particles (Dnl) over the number average polymer particle size of the medium particles (Dnm), is 3 to 1.8.

18. The method according to claim 1 wherein the difference between the maximum of two end peaks of a size distribution profile is in the range of 50 to 500 nm.

19. The method according to claim 1 wherein the polymer particles size are less than 1000 nm.

20. The method according to claim 1 wherein the nanotube-polymer composite has a percolation threshold of less than 0.5% carbon nanotubes in the composite.

21. The method according to claim 1 wherein the carbon nanotube-polymer composite comprises nanotubes in an amount less than about 10 wt % of the composite.

22. The method of claim 1 wherein said first solvent and said second solvent are water.

23. The method according to claim 1 wherein the difference between the maximum of two end peaks of a size distribution profile is in the range of 150 to 300 nm.

24. The method according to claim 1 wherein the carbon nanotube-polymer composite comprises nanotubes in an amount less than about 5 wt % of the composite.

25. The method according to claim 1 wherein the carbon nanotube-polymer composite comprises nanotubes in an amount less than about 1 wt % of the composite.

26. The method according to claim 1 wherein the carbon nanotube-polymer composite comprises nanotubes in an amount less than about 0.1 wt % of the composite.

* * * * *